US011981328B2

(12) United States Patent
Xu

(10) Patent No.: US 11,981,328 B2
(45) Date of Patent: May 14, 2024

(54) VEHICLE OBJECT AVOIDANCE

(71) Applicant: Ford Global Technologies, LLC, Dearborn, MI (US)

(72) Inventor: Li Xu, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 297 days.

(21) Appl. No.: 17/590,862

(22) Filed: Feb. 2, 2022

(65) Prior Publication Data

US 2023/0242101 A1   Aug. 3, 2023

(51) Int. Cl.
| | | |
|---|---|---|
| *B60W 30/00* | (2006.01) | |
| *B60W 10/18* | (2012.01) | |
| *B60W 10/20* | (2006.01) | |
| *B60W 30/09* | (2012.01) | |
| *B60W 30/095* | (2012.01) | |
| *B60W 40/04* | (2006.01) | |
| *B60W 40/105* | (2012.01) | |
| *B60W 50/16* | (2020.01) | |
| *B60W 50/14* | (2020.01) | |

(52) U.S. Cl.
CPC ............ *B60W 30/09* (2013.01); *B60W 10/18* (2013.01); *B60W 10/20* (2013.01); *B60W 30/0953* (2013.01); *B60W 30/0956* (2013.01); *B60W 40/04* (2013.01); *B60W 40/105* (2013.01); *B60W 50/16* (2013.01); *B60W 2050/143* (2013.01); *B60W 2050/146* (2013.01); *B60W 2540/18* (2013.01); *B60W 2554/80* (2020.02)

(58) Field of Classification Search
CPC ...... B60W 30/09; B60W 10/18; B60W 10/20; B60W 30/0953; B60W 30/0956; B60W 40/04; B60W 40/105; B60W 50/16; B60W 2050/143; B60W 2050/146; B60W 2540/18; B60W 2554/80
See application file for complete search history.

(56) References Cited

U.S. PATENT DOCUMENTS

| | | | |
|---|---|---|---|
| 10,466,058 B2 | 11/2019 | Grimm | |
| 11,001,256 B2 | 5/2021 | Packer et al. | |
| 2017/0369054 A1* | 12/2017 | Nishimura | .......... B60W 30/095 |
| 2019/0163191 A1 | 5/2019 | Sorin et al. | |
| 2021/0046940 A1 | 2/2021 | Feser et al. | |
| 2021/0155257 A1* | 5/2021 | Alcazar Olan | ....... B60W 50/14 |

FOREIGN PATENT DOCUMENTS

CN         112464384 A       3/2021

* cited by examiner

*Primary Examiner* — Khoi H Tran
*Assistant Examiner* — Tien Minh Le
(74) *Attorney, Agent, or Firm* — Frank A. MacKenzie; Bejin Bieneman PLC

(57) ABSTRACT

A computer includes a processor and a memory, and the memory stores instructions executable by the processor to represent a vehicle as a vehicle boundary; represent an object as an object polygon including object vertices and object sides; determine a turning center of a turning radius of the vehicle; select the object vertices projected to intersect the vehicle boundary; for the selected object vertices, determine respective object central angles with respect to the turning center between the respective object vertex and an object intersection with the vehicle boundary; select a smallest central angle from a set including the object central angles; and actuate a component of the vehicle based on the smallest central angle.

20 Claims, 6 Drawing Sheets

VEHICLE OBJECT AVOIDANCE

BACKGROUND

Modern vehicles typically include sensors. Some sensors detect the external world, e.g., objects and/or characteristics of surroundings of the vehicle, such as other vehicles, road lane markings, traffic lights and/or signs, pedestrians, etc. For example, some sensors can be radar sensors, scanning laser range finders, light detection and ranging (LIDAR) devices, and image processing sensors such as cameras. A LIDAR device detects distances to objects by emitting laser pulses at a particular wavelength and measuring the time of flight for the pulse to travel to the object and back.

DETAILED DESCRIPTION

Figure 1:
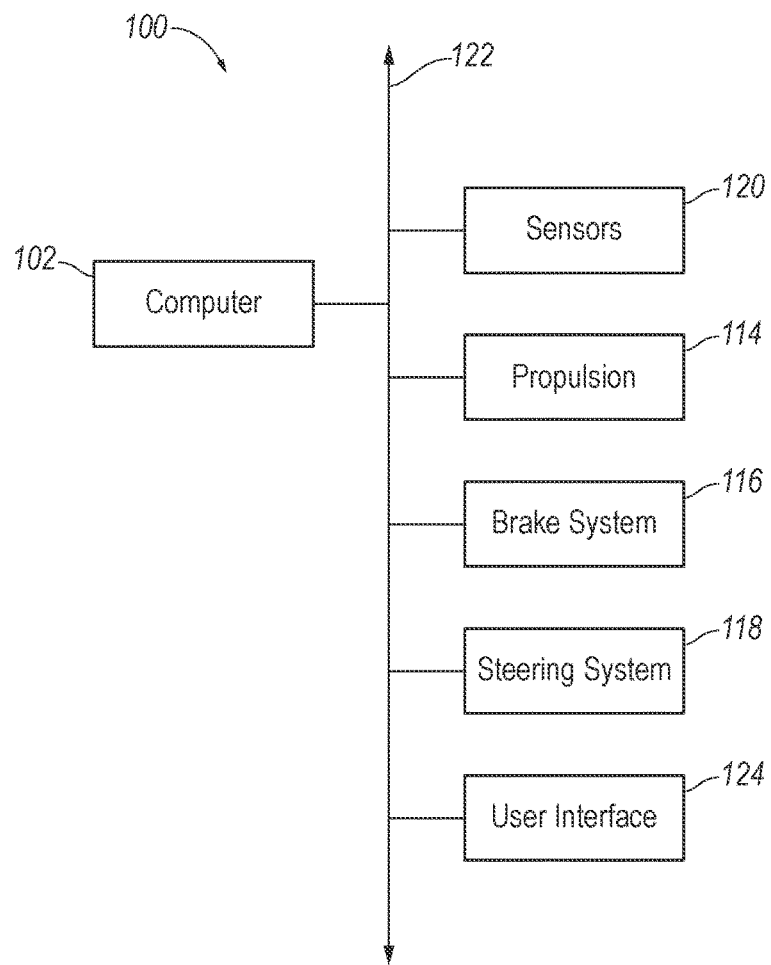
FIG. 1 is a block diagram of an example vehicle.

The systems and techniques described herein provide a computationally efficient way to track an object in the vicinity of a vehicle and to actuate components of the vehicle to avoid the object. In particular, a computer on board the vehicle can be programmed to represent the vehicle as a vehicle boundary, represent an object as an object polygon including object vertices and object sides, determine a turning center of a turning radius of the vehicle, select the object vertices projected to intersect the vehicle boundary, determine object central angles with respect to the turning center between the respective object vertex and an object intersection with the vehicle boundary for the selected object vertices, select a smallest of the object central angles, and actuate a component of the vehicle based on the smallest central angle. An object central angle is, in other words, an angle swept by the vehicle at a constant turning radius from a current position to an intersection with a respective object vertex. The smallest central angle is thus the shortest angle swept by the vehicle until an intersection with any object vertex. The component of the vehicle can be, e.g., a brake system and/or a steering system. The polygon representation of the object and the use of the central angles facilitates an efficient determination of how long or how far until the vehicle impacts the object. The determination can be made by performing simple algebraic manipulations. The vehicle can be actuated to avoid the impact while minimizing disturbances to occupants of the vehicle.

A computer includes a processor and a memory, and the memory stores instructions executable by the processor to represent a vehicle as a vehicle boundary; represent an object as an object polygon including object vertices and object sides; determine a turning center of a turning radius of the vehicle; select the object vertices projected to intersect the vehicle boundary; for the selected object vertices, determine respective object central angles with respect to the turning center between the respective object vertex and an object intersection with the vehicle boundary; select a smallest central angle from a set including the object central angles; and actuate a component of the vehicle based on the smallest central angle.

The vehicle boundary may be a vehicle polygon including vehicle vertices and vehicle sides. The instructions may further include instructions to select the vehicle vertices projected to intersect the object sides and, for the selected vehicle vertices, determine respective vehicle central angles with respect to the turning center between the respective vehicle vertex and a vehicle intersection with the respective object side, and the set includes the vehicle central angles. The instructions may further include instructions to determine respective circles centered on the turning center that pass through the respective vehicle vertices, and selecting the vehicle vertices projected to intersect the object sides may include selecting the vehicle vertices for which the respective circles intersect the object sides. The circles may be vehicle circles, the instructions may further include instructions to determine respective object circles centered on the turning center that pass through the respective object vertices, and selecting the object vertices projected to intersect the vehicle sides may include selecting the object vertices for which the respective object circles intersect the vehicle sides.

The vehicle polygon may include at least five vehicle vertices.

The instructions may further include instructions to determine a path length from a current position of the vehicle until the vehicle boundary intersects the object polygon based on the smallest central angle, and actuating the component based on the smallest central angle may include actuating the component based on the path length. The component may include a brake system, and actuating the component based on the smallest central angle may include determining a deceleration for the brake system based on the path length.

The instructions may further include instructions to determine a time to intersection based on the path length and a speed of the vehicle, and actuating the component based on the path length may include actuating the component based on the time to intersection.

The instructions may further include instructions to determine at least one of a time or a path length from a current position of the vehicle until the vehicle boundary intersects the object polygon based on the smallest central angle, and actuating the component based on the smallest central angle may include actuating the component based on the at least one of the time or path length. Actuating the component based on the smallest central angle may include actuating the component in response to the at least one of the time or the path length being below a threshold.

The instructions may further include instructions to determine respective circles centered on the turning center that pass through the respective object vertices, and selecting the object vertices projected to intersect the vehicle boundary may include selecting the object vertices for which the respective object circles intersect the vehicle boundary.

The component may include a brake system.

The component may include a steering system. The instructions may further include instructions to determine a steering angle for which the object vertices are projected to avoid the vehicle boundary, and actuating the component may include actuating the steering system to the determined steering angle. The instructions may further include instructions to, for a plurality of candidate steering angles, determine whether either the object vertices are projected to intersect the vehicle boundary, and determining the determined steering angle may include selecting a smallest steering angle of the candidate steering angles for which the object vertices are projected to avoid the vehicle boundary. The instructions may further include instructions to determine respective candidate turning centers for the respective candidate steering angles, and determining whether the object vertices are projected to intersect the vehicle boundary for a respective one of the candidate steering angles may be based on the respective candidate turning center.

The instructions may further include instructions to determine the turning radius based on one of a steering angle or a planned path of the vehicle.

The component may include a user interface, and actuating the component based on the smallest central angle may include instructing the user interface to output a message.

A method includes representing a vehicle as a vehicle boundary; representing an object as an object polygon including object vertices and object sides; determining a turning center of a turning radius of the vehicle; selecting the object vertices projected to intersect the vehicle boundary; for the selected object vertices, determining respective object central angles with respect to the turning center between the respective object vertex and an object intersection with the vehicle boundary; selecting a smallest central angle from a set including the object central angles; and actuating a component of the vehicle based on the smallest central angle.

With reference to the Figures, wherein like numerals indicate like parts throughout the several views, a computer 102 includes a processor and a memory, and the memory stores instructions executable by the processor to represent a vehicle 100 as a vehicle boundary 104; represent an object 106 as an object polygon 108 including object vertices 110 and object sides 112; determine a turning center C of a turning radius $r_v$ of the vehicle 100; select the object vertices 110 projected to intersect the vehicle boundary 104; for the selected object vertices 110, determine respective object central angles $\beta_i$ with respect to the turning center C between the respective object vertex 110 and an object intersection 136 with the vehicle boundary 104; select a smallest central angle θ from a set including the object central angles $\beta_i$; and actuate a component of the vehicle 100 based on the smallest central angle θ.

With reference to FIG. 1, the vehicle 100 may be any passenger or commercial automobile such as a car, a truck, a sport utility vehicle, a crossover, a van, a minivan, a taxi, a bus, etc.

The vehicle 100 may be an autonomous vehicle. The computer 102 can be programmed to operate the vehicle 100 independently of the intervention of a human operator, completely or to a lesser degree. The computer 102 may be programmed to operate a propulsion 114, a brake system 116, a steering system 118, and/or other vehicle systems based on data received from sensors 120. For the purposes of this disclosure, autonomous operation means the computer 102 controls the propulsion 114, brake system 116, and steering system 118 without input from a human operator; semi-autonomous operation means the computer 102 controls one or two of the propulsion 114, brake system 116, and steering system 118 and a human operator controls the remainder; and nonautonomous operation means a human operator controls the propulsion 114, brake system 116, and steering system 118.

The computer 102 is a microprocessor-based computing device, e.g., a generic computing device including a processor and a memory, an electronic controller or the like, a field-programmable gate array (FPGA), an application-specific integrated circuit (ASIC), a combination of the foregoing, etc. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. The computer 102 can thus include a processor, a memory, etc. The memory of the computer 102 can include media for storing instructions executable by the processor as well as for electronically storing data and/or databases, and/or the computer 102 can include structures such as the foregoing by which programming is provided. The computer 102 can be multiple computers coupled together.

The computer 102 may transmit and receive data through a communications network 122 such as a controller area network (CAN) bus, Ethernet, WiFi, Local Interconnect Network (LIN), onboard diagnostics connector (OBD-II), and/or by any other wired or wireless communications network. The computer 102 may be communicatively coupled to the sensors 120, the propulsion 114, the brake system 116, the steering system 118, a user interface 124, and other components via the communications network 122.

The sensors 120 may provide data about operation of the vehicle 100, for example, wheel speed, wheel orientation, and engine and transmission data (e.g., temperature, fuel consumption, etc.). The sensors 120 may detect the location and/or orientation of the vehicle 100. For example, the sensors 120 may include global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The sensors 120 may detect the external world, e.g., the objects 106 and/or characteristics of surroundings of the vehicle 100, such as other vehicles, road lane markings, traffic lights and/or signs, pedestrians, etc. For example, the sensors 120 may include radar sensors, scanning laser range finders, light detection and ranging (LIDAR) devices, and image processing sensors such as cameras.

The propulsion 114 of the vehicle 100 generates energy and translates the energy into motion of the vehicle 100. The propulsion 114 may be a conventional vehicle propulsion subsystem, for example, a conventional powertrain including an internal-combustion engine coupled to a transmission that transfers rotational motion to wheels; an electric powertrain including batteries, an electric motor, and a transmission that transfers rotational motion to the wheels; a hybrid powertrain including elements of the conventional powertrain and the electric powertrain; or any other type of propulsion. The propulsion 114 can include an electronic control unit (ECU) or the like that is in communication with and receives input from the computer 102 and/or a human operator. The human operator may control the propulsion 114 via, e.g., an accelerator pedal and/or a gear-shift lever.

The brake system 116 is typically a conventional vehicle braking subsystem and resists the motion of the vehicle 100 to thereby slow and/or stop the vehicle 100. The brake system 116 may include friction brakes such as disc brakes, drum brakes, band brakes, etc.; regenerative brakes; any other suitable type of brakes; or a combination. The brake system 116 can include an electronic control unit (ECU) or the like that is in communication with and receives input from the computer 102 and/or a human operator. The human operator may control the brake system 116 via, e.g., a brake pedal.

The steering system 118 is typically a conventional vehicle steering subsystem and controls the turning of the wheels. The steering system 118 may be a rack-and-pinion system with electric power-assisted steering, a steer-by-wire system, as both are known, or any other suitable system. The steering system 118 can include an electronic control unit (ECU) or the like that is in communication with and receives input from the computer 102 and/or a human operator. The human operator may control the steering system 118 via, e.g., a steering wheel.

The user interface 124 presents information to and receives information from an occupant of the vehicle 100. The user interface 124 may be located, e.g., on an instrument panel in a passenger cabin of the vehicle 100, or wherever may be readily seen by the occupant. The user interface 124 may include dials, digital readouts, screens, speakers, and so on for providing information to the occupant, e.g., human-machine interface (HMI) elements such as are known. The user interface 124 may include buttons, knobs, keypads, microphone, and so on for receiving information from the occupant.

Figure 2:
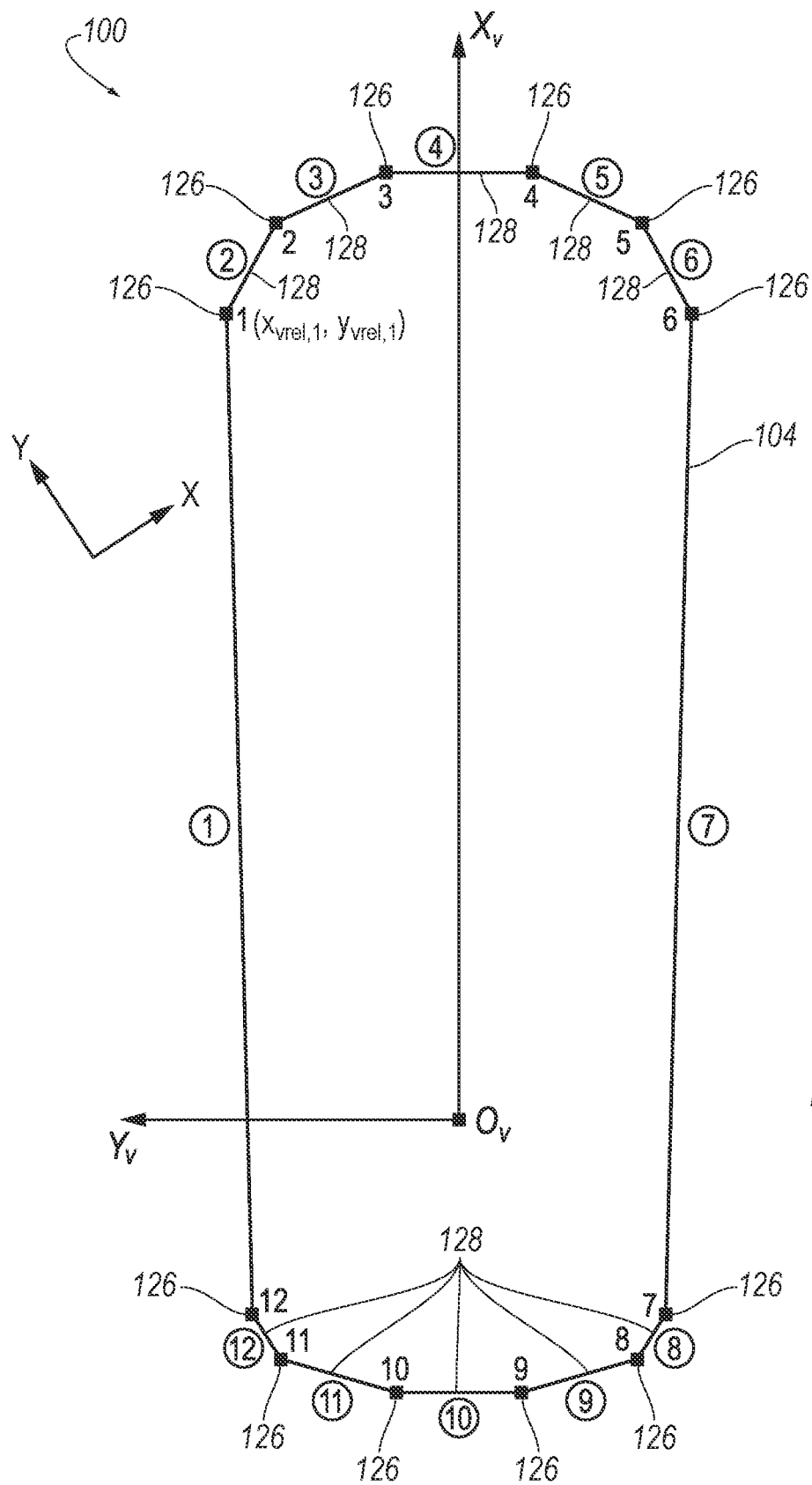
FIG. 2 is a top diagrammatic view of a vehicle boundary representing the vehicle.

With reference to FIG. 2, the vehicle 100 and the object 106 (shown in FIGS. 3-4) can be situated with respect to a global coordinate system. In this context, the "global coordinate system" is a geo-location longitude and latitude coordinate system where coordinates are specified for the surface of the earth according to a fixed origin, i.e., an origin that does not change as an object moves and that does not depend on the location of any object with respect to the coordinate system, e.g., a Global Navigation Satellite System (GNSS) such as the Global Positioning System (GPS). The latitude coordinates, i.e., north-south, can be represented with a Y-axis. The longitude coordinates, i.e., east-west, can be represented with an X-axis. A "position" is a set of (x, y) coordinates representing a longitude and a latitude, respectively, in the global coordinate system. The vehicle 100 defines a heading angle φ that is an angle defined between a longitudinal axis $X_v$ of the vehicle 100, as described below and shown in FIG. 4, and the X-axis of the global coordinate system.

The computer 102 can collect data from the sensors 120 in a local coordinate system, e.g., a vehicle coordinate system. In this context, a "vehicle coordinate system" of the vehicle 100 is a two-dimensional coordinate system having an origin $O_v$ that is a point on and/or in the vehicle 100. In the example of FIG. 2, the origin $O_v$ is a center point of a rear axle of the vehicle 100. The origin can be a predetermined point on the vehicle 100 stored in the memory of the computer 102. The local coordinate system has a longitudinal axis $X_v$ and a lateral axis $Y_v$ extending from the origin $O_v$.

The computer 102 can be programmed to represent the vehicle 100 as the vehicle boundary 104. The vehicle boundary 104 is a shape enclosing a two-dimensional vertical projection of the vehicle 100, i.e., a footprint of the vehicle 100. The vehicle boundary 104 can be a vehicle polygon, i.e., a shape having a plurality of vehicle vertices 126 and vehicle sides 128 connecting adjacent vehicle vertices 126 to form a closed loop. The vehicle boundary 104 can be stored in the memory of the computer 102. The vehicle boundary 104 can be generated based on a virtual model of the vehicle 100, e.g., a computer-aided design (CAD) diagram, a digital photograph, etc.

The vehicle boundary 104 can include the vehicle vertices 126. Each vehicle vertex 126 has a set of coordinates ($x_{vrel,i}$, $y_{vrel,i}$) in the vehicle coordinate system, where i is a natural number between 1 and a total number $n_v$ of vehicle vertices 126. In FIG. 2, each vehicle vertex 126 is represented with a number between 1 and 12, representing the twelve vehicle vertices 126 of the vehicle boundary 104 in that example. Alternatively, the vehicle boundary 104 can have a different number of vehicle vertices 126, e.g., five, eight, sixteen, etc. The vehicle boundary 104 can include at least five vehicle vertices 126. The coordinates ($x_{vrel,i}$, $y_{vrel,i}$) are relative distances between the respective vehicle vertex 126 and the origin $O_v$. The computer 102 can identify global coordinates ($x_{v,i}$, $y_{v,i}$) for each vertex:

$$x_{v,i} = x + x_{vrel,i} \cos\varphi - y_{vrel,i} \sin\varphi$$

$$y_{v,i} = y + x_{vrel,i} \cos\varphi - y_{vrel,i} \sin\varphi$$

The vehicle boundary 104 can include the vehicle sides 128. The vehicle sides 128 extend as a straight line between adjacent pairs of vehicle vertices 126 to form a polygon, i.e., a closed plane figure with straight edges. In FIG. 2, each vehicle side 128 is represented with a number enclosed in a circle, the number being between 1 and 12 to represent the twelve vehicle sides 128. The vehicle polygon can be a convex polygon, i.e., a polygon in which an angle defined between two adjacent vehicle sides 128 is less than 180°. The vehicle polygon can include at least five vehicle sides 128, e.g., twelve vehicle sides 128 as shown in FIG. 2. Each vehicle side 128 is thus defined according to a Euclidean distance between a pair of vehicle vertices 126:

$$vseg_i = \sqrt{(x_{v,i} - x_{v,j})^2 + (y_{v,i} - y_{v,j})^2}$$

in which $vseg_i$ is the vehicle side 128 and i, j are consecutive indices between 1 and $n_v$, e.g., 1 and 2, 2 and 3, . . . 11 and 12, 12 and 1.

Figure 3:
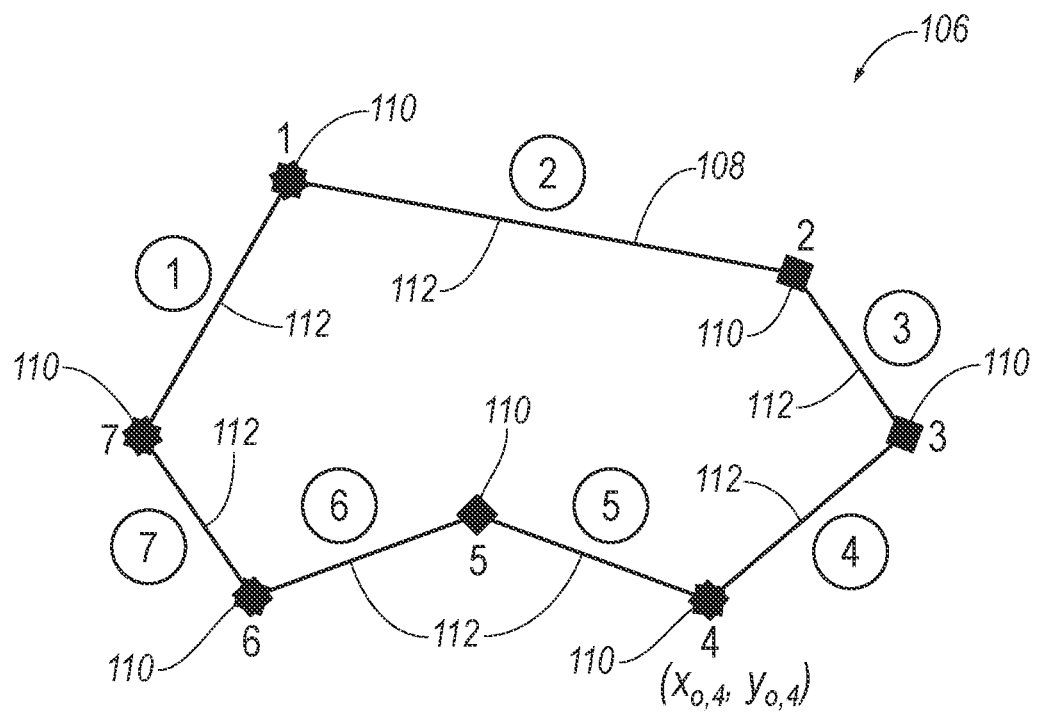
FIG. 3 is a top diagrammatic view of an object polygon representing an object.

With reference to FIG. 3, the object 106 is something in the vicinity of the vehicle 100 that can be involved in an impact with the vehicle 100. For example, the object 106 can be, e.g., another vehicle, a pedestrian, a cyclist, a barrier, etc. The computer 102 can be programmed to represent the object 106 as the object polygon 108. The object polygon 108 is a shape enclosing a two-dimensional vertical projection of the object 106, i.e., a footprint of the object 106. The object polygon 108 is a polygon, i.e., a shape having a plurality of the object vertices 110 and the object sides 112 connecting adjacent object vertices 110 to form a closed loop. The computer 102 can determine the object polygon 108 based on sensor data of the object 106, e.g., a three-dimensional point cloud, a depth map, etc.

The object polygon 108 can include the object vertices 110. Each object vertex 110 has a set of coordinates ($x_{o,j}$, $y_{o,j}$) in the global coordinate system, where j is a natural number between 1 and a total number $n_o$ of object vertices 110. In FIG. 3, each object vertex 110 is represented with a number between 1 and 7, representing the seven object vertices 110 of the object polygon 108. Alternatively, the object polygon 108 can have a different number of object vertices 110, e.g., five, eight, sixteen, etc.

The object polygon 108 can include the object sides 112. The object sides 112 extend as straight lines between adjacent pairs of object vertices 110 to form a polygon, i.e., a closed plane figure with straight edges. In FIG. 3, each vehicle side 128 is represented with a number enclosed in a circle, the number being between 1 and 7 to represent the seven object sides 112. The object polygon 108 can be a convex or concave polygon. Each object side 112 is thus defined according to a Euclidean distance between a pair of object vertices 110:

$$oseg_i = \sqrt{(x_{o,i} - x_{o,j})^2 + (y_{o,i} + y_{o,j})^2}$$

in which $oseg_i$ is the object side 112 and i, j are consecutive indices between 1 and $n_o$, e.g., 1 and 2, 2 and 3, . . . 6 and 7, 7 and 1.

Figure 4:
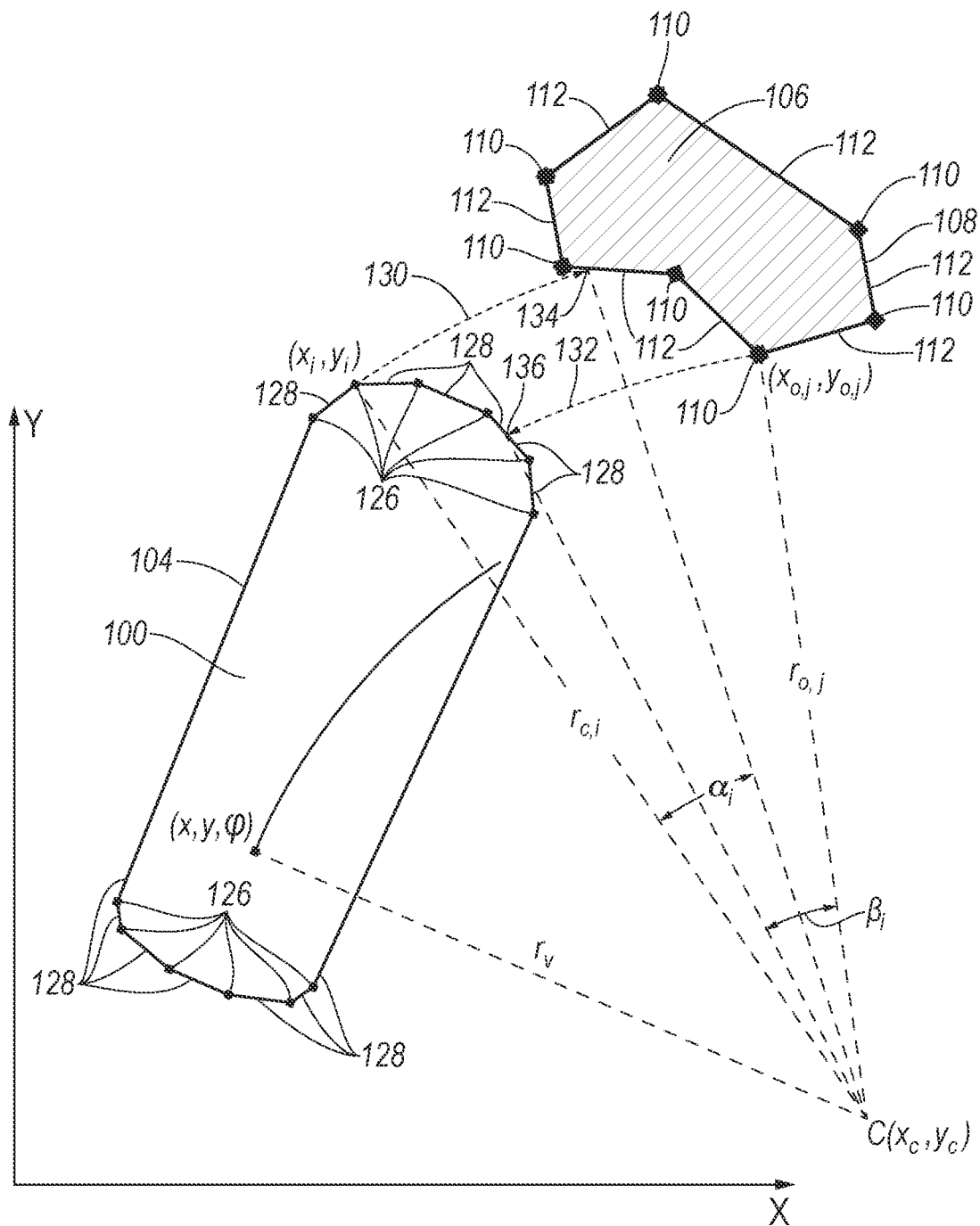
FIG. 4 is a top diagrammatic view of the vehicle boundary and the object polygon as the vehicle performs a turn.

With reference to FIG. 4, the computer 102 can be programmed to determine the turning radius $r_v$ of the vehicle 100 based on a steering angle δ of the vehicle 100. A "turning radius" is a radius of a circle along which the vehicle 100 travels in a turn. That is, as the vehicle 100 turns, the path that the vehicle 100 follows defines an arc of a circle, and the turning radius is the radius of the circle:

$$r_v = \frac{WB}{\tan\delta}$$

in which WB is the wheelbase of the vehicle 100 and δ is the steering angle. The wheelbase WB is the distance between the front axle and rear axle of the vehicle 100. The wheelbase WB can be stored in the memory of the computer 102. The steering angle δ is an angle defined between a front wheel of the vehicle 100 and an axis extending through the front wheel parallel to a longitudinal axis of the vehicle 100. A positive steering angle δ is defined as counterclockwise (i.e., turning left) and a negative steering angle δ is defined as clockwise (i.e., turning right). The computer 102 can determine the steering angle δ by measuring a steering-wheel angle from data from a steering wheel sensor of the sensors 120 and multiplying the steering-wheel angle by a steering ratio, i.e., the ratio of an angle change of the steering wheel to an angle change of the front wheel. The steering ratio can be stored in the memory of the computer 102.

Alternatively or additionally, the computer 102 can be programmed to determine the turning radius $r_v$ based on a planned path of the vehicle 100. A path-planning algorithm can determine a path along which the vehicle 100 travels. For example, the path-planning algorithm can generate a planned path p(x) that is a polynomial function of an upcoming distance x. In the present context, the "upcoming distance" x is a predetermined longitudinal distance in front of the vehicle 100 from a front bumper of the vehicle 100 at which the sensors 120 collect data and the computer 102 predicts the path. The computer 102 can determine the turning radius $r_v$ based on a curvature of a portion of the planned path p(x), e.g., according to a conventional curvature technique:

$$r_v = \frac{(1 + (p')^2)^{\frac{3}{2}}}{|p''|}$$

in which p' is the first derivative of the path polynomial p(x) with respect to x and p" is the second derivative of the path polynomial p(x) with respect to x. The path polynomial p(x) predicts the path as a line traced by a polynomial equation. The path polynomial p(x) predicts the path for a predetermined upcoming distance x, by determining a lateral coordinate y, e.g., measured in meters:

$$y = p(x) = \alpha_0 + \alpha_1 x + \alpha_2 x^2 + \alpha_3 x^3$$

in which $\alpha_0$ is an offset, i.e., a lateral distance between the path and a center line of the vehicle 100 at the upcoming distance x; $\alpha_1$ is a heading angle of the path; $\alpha_2$ is the curvature of the path, and $\alpha_3$ is the curvature rate of the path. The upcoming distance x can be determined based on, e.g., a current speed of the vehicle 100, a predetermined time threshold, empirical simulation data, a detection range of the sensors 120, etc. The time threshold can be, e.g., 1 second. The path polynomial can include one or more Bezier curves, i.e., polynomial functions that each represent a disjoint subset of points representing the path, and that taken together, represent the entire set of points representing the path. Bezier curves can be constrained to be continuously differentiable and have constraints or limits on the permitted derivatives, e.g., limits on the rates of change, with no discontinuities. Bezier curves can also be constrained to match derivatives with other Bezier curves at boundaries, providing smooth transitions between subsets. Constraints on Bezier curves can make a path polynomial a steerable path polynomial by limiting the rates of longitudinal and lateral accelerations required to pilot a vehicle 100 along the vehicle path polynomial, where braking torque and powertrain torque are applied as positive and negative longitudinal accelerations and clockwise and counterclockwise steering torque are applied as left and right lateral accelerations.

The computer 102 can be programmed to determine the turning center C of the turning radius of the vehicle 100, i.e., the turning center C from which the turning radius $r_v$ extends. The turning center C has coordinates ($x_c$, $y_c$) in the global coordinate system. The computer 102 can determine a current position (x, y) and heading angle φ of the vehicle 100, as described above. The computer 102 can then identify the coordinates ($x_c$, $y_c$) of the turning center C:

$$x_c = x - r_v \cos\varphi$$

$$y_c = y + r_v \sin\varphi$$

As the vehicle 100 travels through the turn, the vehicle boundary 104 can rotate around the turning center C so that the vehicle boundary 104 retains a constant orientation relative to the turning center C.

The computer 102 can be programmed to select the object vertices 110 projected to intersect the vehicle boundary 104 and the vehicle vertices 126 projected to intersect the object sides 112. The computer 102 can project the motion of the vehicle 100 until the object vertices 110 intersect the vehicle boundary 104 and the vehicle vertices 126 intersect the object sides 112 and select the vehicle vertices 126 and object vertices 110 that intersect. For example, the computer 102 can select the object vertices 110 and vehicle vertices 126 assuming that the vehicle 100 will travel at a constant turning radius $r_v$ around the turning center C. The vehicle 100 vertices are on vehicle circles 130 centered on the turning center C, and the vehicle vertices 126 that are selected are those with vehicle circles 130 that intersect at least one of the object sides 112, as will be described below. The object vertices 110 are on object circles 132 centered on the turning center C, and the object vertices 110 that are selected are those with object circles 132 that intersect the vehicle boundary 104, as will be described below.

The computer 102 can be programmed to determine the respective vehicle circles 130 centered on the turning center C that pass through the respective vehicle vertices 126. For example, the computer 102 can determine respective radii $r_{c,i}$ based on the turning center C and the respective vehicle vertices 126. Each radius $r_{c,i}$ is equal to a Euclidean distance between the turning center C and the respective vehicle vertex 126:

$$r_{c,i} = \sqrt{(x_c - x_{v,i})^2 + (y_c - y_{v,i})^2}$$

The radius $r_{c,i}$ defines the vehicle circle 130 having a center at the turning center C and the radius $r_{c,i}$ extending to the location of the vehicle vertex 126. The vehicle circle 130 represents the path of the vehicle vertex 126 of the vehicle 100 while the vehicle 100 is turning. That is, the path of the vehicle vertex 126 is represented by the vehicle circle 130, and when the vehicle circle 130 intersects the object polygon 108, the vehicle 100 is likely to impact the object 106. The computer 102 can determine that the vehicle 100 is likely to impact the object 106 when the object polygon 108, i.e., at least one of the object sides 112, intersects the vehicle circle 130. The point at which the object polygon 108 intersects the vehicle circle 130 is a vehicle intersection point 134 having coordinates $(x_{v,i,int}, y_{v,i,int})$. That is, the vehicle intersection point 134 has coordinates on the vehicle circle 130:

$$r_{c,i}^2 = \sqrt{(x_{v,i,int} - x_c)^2 + (y_{v,i,int} - y_c)^2}$$

Selecting the vehicle vertices 126 projected to intersect the object sides 112 can include selecting the vehicle vertices 126 for which the respective vehicle circles 130 intersect the object sides 112. For each vehicle circle 130, when the object polygon 108 intersects the vehicle circle 130, the coordinates of the vehicle intersection point 134 $(x_{v,i,int}, y_{v,i,int})$ coincide with coordinates of a point on the object sides 112:

$$x_{v,i,int} = x_{o,j} t + x_{o,i}(1-t)$$

$$y_{v,i,int} = y_{o,j} t + y_{o,i}(1-t)$$

in which i, j are consecutive indices between 1 and the number $n_o$ of object vertices 110 and t is a dummy variable that indicates whether the vehicle circle 130 intersects a location between the object vertices 110 defining the object side 112. That is, the computer 102 can determine the vehicle intersection point 134 as a location where the vehicle circle 130 intersects one of the object sides 112 based on respective locations of the object vertices 110 between which the object side 112 extends. When the variable t is between 0 and 1, the coordinates $(x_{v,i,int}, y_{v,i,int})$ lie on the object side 112. When the variable t is less than 0, greater than 1, or complex, the coordinates $(x_{v,i,int}, y_{v,i,int})$ do not lie on the object side 112. When t is 0 or 1, the coordinates $(x_{v,i,int}, y_{v,i,int})$ coincide with one of the object vertices 110. Thus, points on the vehicle circle 130 that generate values of t between 0 and 1 are vehicle intersection points 134.

Inserting this definition of the intersection point coordinates $(x_{v,i,int}, y_{v,i,int})$ into the equation for the vehicle circle 130 generates a quadratic equation in the variable t:

$$r_{c,i}^2 = ((x_{v,j} t + x_{v,i}(1-t)) - x_c)^2 + ((y_{v,j} t + y_{v,i}(1-t)) - y_c)^2$$

The computer 102 can solve the quadratic equation using, e.g., the quadratic formula, to find solutions for t. If the solutions for t are complex (i.e., including an imaginary part) or there is only one solution for t, the computer 102 can determine that the vehicle circle 130 does not intersect the object side 112 and no vehicle intersection point 134 exists. If there are two solutions for t, one or both of which are $t \leq 0$ and $t \geq 1$, the computer 102 can determine that the vehicle circle 130 does not intersect the object side 112 and no vehicle intersection point 134 exists. If there are two solutions for t, at least one of which satisfies $0 < t < 1$, the computer 102 can determine that the vehicle circle 130 intersects the object side 112 at the vehicle intersection point 134 defined by the value of t between 0 and 1. The computer 102 can determine solutions for t for each object side 112 to determine whether the vehicle circle 130 intersects any of the object sides 112 by cycling through the indices i, j, and then the computer 102 can repeat the process for each of the vehicle circles 130. The computer 102 can select the vehicle circles 130 having vehicle intersection points 134 with the object polygon 108.

For the selected vehicle vertices 126, the computer 102 can determine respective vehicle central angles $\alpha_i$ with respect to the turning center C between the respective vehicle vertex 126 and the vehicle intersection point 134 with the respective object side 112. That is, for each selected vehicle vertex 126, the computer 102 can determine the vehicle central angle $\alpha_i$ between lines extending from the turning center C to the respective vehicle intersection point 134 and that vehicle vertex 126:

$$\alpha_i = \cos^{-1}\left(\frac{(2r_{c,i}^2 - (x_{v,i,int} - x_{v,i})^2 - (y_{v,i,int} - y_{v,i})^2)}{2r_{c,i}^2}\right)$$

The computer 102 can determine the respective vehicle central angles $\alpha_i$ for the selected vehicle vertices 126.

The computer 102 can be programmed to determine the respective object circles 132 centered on the turning center C that pass through the respective object vertices 110. For example, the computer 102 can determine respective radii $r_{o,i}$ based on the turning center C and the respective object vertices 110. Each radius $r_{o,i}$ is equal to a Euclidean distance between the turning center C and the respective object vertex 110:

$$r_{o,i} = \sqrt{(x_c - x_{o,i})^2 + (y_c - y_{o,i})^2}$$

The radius $r_{o,i}$ defines the object circle 132 having a center at the turning center C and the radius $r_{o,i}$ extending to the location of the object vertex 110. The object circle 132 represents the position of the object vertex 110 of the object 106 while the vehicle 100 is turning. That is, the position of the object vertex 110 is represented by the object circle 132, and when the object circle 132 intersects the vehicle boundary 104, the vehicle 100 is likely to impact the object 106. The computer 102 can determine that the vehicle 100 is likely to impact the object 106 when the vehicle boundary 104, e.g., at least one of the vehicle sides 128, intersects the object circle 132. The point at which the vehicle boundary 104 intersects the object circle 132 is an object intersection point 136 having coordinates $(x_{o,i,int}, y_{o,i,int})$. That is, the object intersection point 136 has coordinates on the object circle 132:

$$r_{o,i}^2 = (x_{o,i,int} - x_c)^2 + (y_{o,i,int} - y_c)^2$$

Selecting the object vertices 110 projected to intersect the vehicle sides 128 can include selecting the object vertices 110 for which the respective object circles 132 intersect the vehicle sides 128. For each object circle 132, when the vehicle boundary 104 intersects the vehicle circle 130, the coordinates of the object intersection point 136 $(x_{o,i,int}, y_{o,i,int})$ coincide with coordinates of a point on the vehicle sides 128:

$$x_{o,i,int} = x_{v,j} t + x_{v,i}(1-t)$$

$$y_{o,i,int} = y_{v,j} t + y_{v,i}(1-t)$$

in which i, j are consecutive indices between 1 and the number $n_v$ of vehicle vertices 126 and t is a dummy variable that indicates whether the object circle 132 intersects a location between the vehicle vertices 126 defining the vehicle side 128. That is, the computer 102 can determine the object intersection point 136 as a location where the object circle 132 intersects one of the vehicle sides 128 based on respective locations of the vehicle vertices 126 between which the vehicle side 128 extends. When the variable t is between 0 and 1, the coordinates ($x_{o,i,int}$, $y_{o,i,int}$) lie on the vehicle side 128. When the variable t is less than 0, greater than 1, or complex, the coordinates ($x_{o,i,int}$, $y_{o,i,int}$) do not lie on the vehicle side 128. When t is 0 or 1, the coordinates ($x_{o,i,int}$, $y_{o,i,int}$) coincide with one of the vehicle vertices 126. Thus, points on the object circle 132 that generate values of t between 0 and 1 are object intersection points 136. The computer 102 can cycle through the indices j to determine whether the object circle 132 intersects any of the vehicle sides 128.

Inserting this definition of the intersection point coordinates ($x_{o,i,int}$, $y_{o,i,int}$) into the equation for the object circle 132 generates a quadratic equation in the variable t:

$$r_{o,i}^2 = ((x_{o,j}t + x_{o,i}(1-t)) - x_c)^2 + ((y_{o,j}t + y_{o,i}(1-t)) - y_c)^2$$

The computer 102 can solve the quadratic equation using, e.g., the quadratic formula, to find solutions for t. If the solutions for t are complex (i.e., including an imaginary part) or there is only one solution for t, the computer 102 can determine that the object circle 132 does not intersect the vehicle side 128 and no object intersection point 136 exists. If there are two solutions for t, one or both of which are t≤0 and t≥1, the computer 102 can determine that the object circle 132 does not intersect the vehicle side 128 and no object intersection point 136 exists. If there are two solutions for t, at least one of which satisfies 0<t<1, the computer 102 can determine that the object circle 132 intersects the vehicle side 128 at the object intersection point 136 defined by the value of t between 0 and 1. The computer 102 can determine solutions for t for each vehicle side 128 to determine whether the object circle 132 intersects any of the vehicle sides 128 by cycling through the indices i, j, and then the computer 102 can repeat the process for each of the object circles 132. The computer 102 can select the object circles 132 having object intersection points 136 with the vehicle boundary 104.

For the selected object vertices 110, the computer 102 can determine respective object central angles $\beta_i$ with respect to the turning center C between the respective object vertex 110 and the object intersection point 136 with the vehicle boundary 104. That is, for each selected object vertex 110, the computer 102 can determine the object central angle $\beta_i$ between lines extending from the turning center C to the respective object intersection point 136 and that object vertex 110:

$$\beta_i = \cos^{-1}\left(\frac{(2r_{o,i}^2 - (x_{v,i,int} - x_{o,i})^2 - (y_{o,i,int} - y_{o,i})^2)}{2r_{o,i}^2}\right)$$

The computer 102 can determine the respective object central angles $\beta_i$ for the selected object vertices 110.

The computer 102 can be programmed to select a smallest central angle θ from a set of angles. The set of angles can include the vehicle central angles $\alpha_i$ and the object central angles $\beta_r$. For example:

$$\theta = \min(\alpha_1, \ldots, \alpha_n, \beta_1, \ldots, \beta_m)$$

in which n is the number of vehicle intersection points 134 and m is the number of object intersection points 136. The smallest central angle θ can be measured from a first vertex from the selected vehicle vertices 126 and selected object vertices 110 to a nearest intersection from the vehicle intersection points 134 and the object intersection points 136. In other words, the first vertex is the one of the selected vehicle vertices 126 and selected object vertices 110 corresponding to the smallest central angle θ, and the nearest intersection is the one of the vehicle intersection points 134 and the object intersection points 136 corresponding to the smallest central angle θ. A first circle is the one of the vehicle circles 130 and object circles 132 corresponding to the smallest central angle θ. The first circle includes the first vertex and the nearest intersection.

The computer 102 can be programmed to determine at least one of a time $T_{min}$ or a path length $s_{min}$ from a current position of the vehicle 100 until the vehicle boundary 104 intersects the object polygon 108 based on the smallest central angle θ. For example, the computer 102 can be programmed to determine the path length based on the smallest central angle θ and the turning radius $r_v$ of the vehicle 100, e.g., as a product of the smallest central angle θ and an absolute value of the turning radius $r_v$, i.e., $s_{min} = \theta |r_v|$.

The computer 102 can be programmed to determine a time to intersection, i.e., the time $T_{min}$ from the current position of the vehicle 100 until the vehicle boundary 104 intersects the object polygon 108. For example, the computer 102 can determine the time $T_{min}$ based on the path length $s_{min}$ and a speed v of the vehicle 100, e.g., as the path length $s_{min}$ divided by the speed v, i.e., $T_{min} = s_{min}/v$. Equivalently, the computer 102 can determine the time $T_{min}$ based on the smallest central angle θ, the turning radius $r_v$ of the vehicle 100, and the speed v, e.g., $T_{min} = \theta|r_v|/v$.

The computer 102 can be programmed to compare the path length $s_{min}$ or the time $T_{min}$ to a threshold. For example, the computer 102 can compare the path length $s_{min}$ to a distance threshold. The distance threshold can be a minimum braking distance to stop the vehicle 100 prior to reaching the object 106. Alternatively or additionally, the distance threshold can be a minimum steering distance to steer the vehicle 100 away from the object 106. The distance threshold can be determined based on empirical testing of vehicles applying brakes and steering at differing speeds and measuring a braking distance and a steering distance for each speed. For another example, the computer 102 can compare the time $T_{min}$ to a time threshold. The time threshold can be a minimum braking time to stop the vehicle 100 prior to reaching the object 106. Alternatively or additionally, the time threshold can be a minimum steering time to steer the vehicle 100 away from the object 106. The time threshold can be determined based on empirical testing of vehicles applying brakes and steering at differing speeds and measuring a braking time and a steering time for each speed.

The computer 102 can be programmed to actuate the component based on the smallest central angle θ. For example, the computer 102 can actuate the component in response to the time $T_{min}$ or the path length $s_{min}$ being below the threshold. The component can include the brake system 116, the steering system 118, and/or the user interface 124.

The computer 102 can be programmed to actuate the brake system 116 based on the smallest central angle θ. Actuating the brake system 116 can include actuating the brake system 116 based on the path length $s_{min}$. For example, to stop the vehicle 100 prior to traveling the path length $s_{min}$, the computer 102 can determine a deceleration a based on the path length $s_{min}$ to stop the vehicle 100 before the vehicle boundary 104 intersects the object polygon 108:

$$a = \frac{v^2}{2\theta|r_v|} = \frac{v^2}{2s_{min}}$$

The computer 102 can actuate the brake system 116 according to the deceleration α.

The computer 102 can be programmed to actuate the steering system 118 based on the smallest central angle θ. For example, the computer 102 can determine a steering angle δ for which the object vertices 110 are projected to avoid the vehicle boundary 104 and for which the vehicle vertices 126 are projected to avoid the object polygon 108, and the computer 102 can actuate the steering system 118 to the determined steering angle δ. More specifically, the computer 102 can generate or store a plurality of candidate steering angles $\delta_i$, e.g., at regular intervals from a minimum (leftmost) steering angle to a maximum (rightmost) steering angle permitted by the steering system 118, e.g., every 0.05 radians (rad) from −0.5 rad to 0.5 rad. For each candidate steering angle $\delta_i$, the computer 102 can determine a respective candidate turning center in the manner described above and, based on the respective candidate turning center, determine whether the object vertices 110 are projected to intersect or avoid the vehicle boundary 104 and whether the vehicle vertices 126 are projected to intersect or avoid the object polygon 108 in the manner described above. The computer 102 can select a smallest steering angle $\delta_{min}$ from the candidate steering angles $\delta_i$ for which the object vertices 110 are projected to avoid the vehicle boundary 104 and the vehicle vertices 126 are projected to avoid the object polygon 108. The computer 102 can actuate the steering system 118 to the determined steering angle $\delta_{min}$.

The computer 102 can be programmed to instruct the user interface 124 to output a message to an occupant of the vehicle 100 based on the smallest central angle θ. The message can indicate, e.g., that the time $T_{min}$ or the path length $s_{min}$ is below the threshold. The message can be, e.g., audio, visual, haptic, etc. For example, the computer 102 can output an audio message through speakers of the user interface 124. For another example, the computer 102 can output a visual message on a display screen of the user interface 124. For another example, the computer 102 can output a haptic message through vibrators of the user interface 124 on a steering wheel and/or a seat in the vehicle 100. Upon providing the message, the computer 102 can receive operator input to avoid the object 106.

Figure 5:
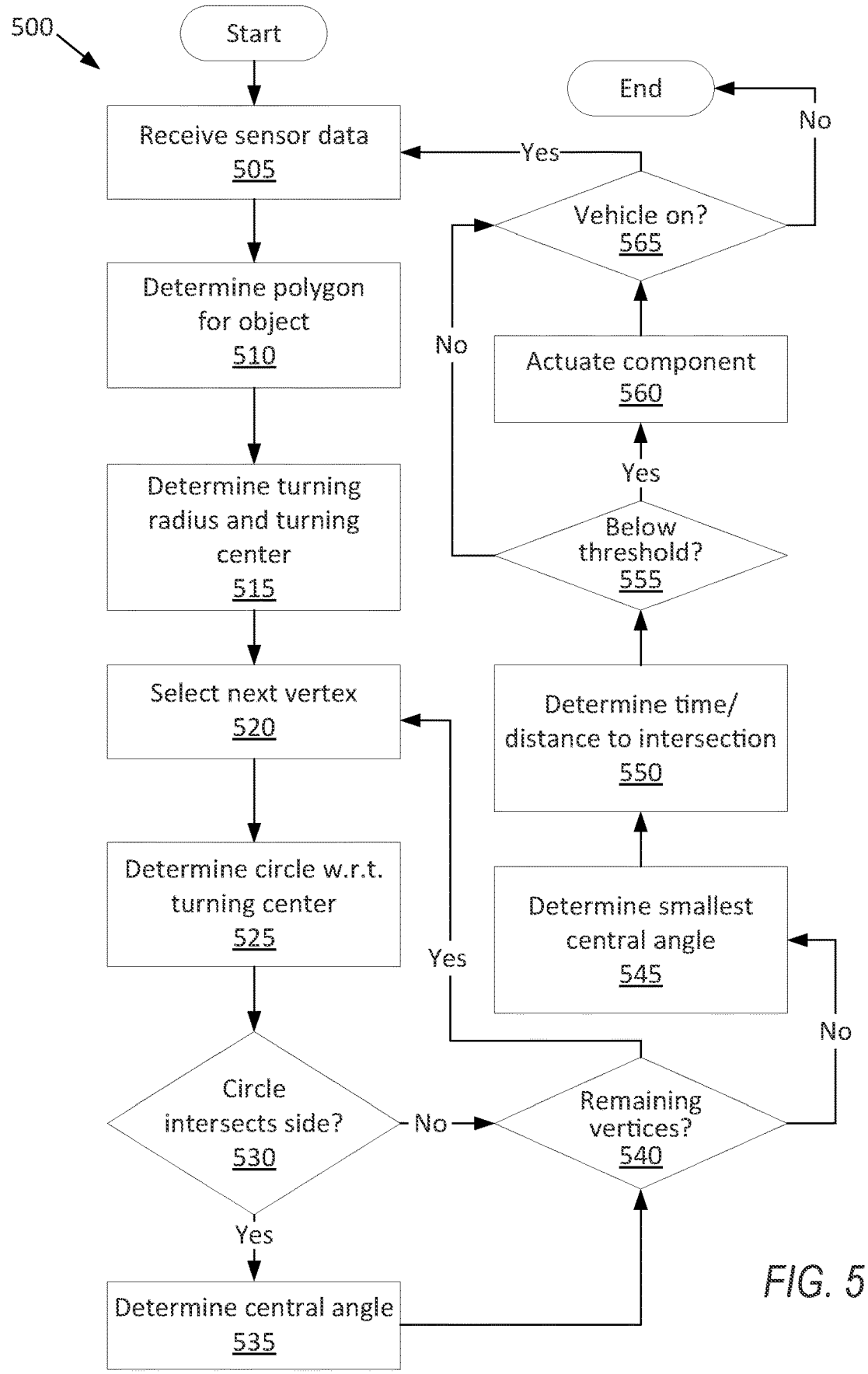
FIG. 5 is a process flow diagram of an example process for controlling the vehicle based on the object.

FIG. 5 is a process flow diagram illustrating an exemplary process 500 for controlling the vehicle 100 based on the object 106, e.g., to avoid the object 106. The memory of the computer 102 stores executable instructions for performing the steps of the process 500 and/or programming can be implemented in structures such as mentioned above. As a general overview of the process 500, the computer 102 receives data from the sensors 120, determines the object polygon 108 for the object 106, and determines the turning radius $r_v$ and turning center C. For each vehicle vertex 126 and object vertex 110, the computer 102 determines the vehicle circle 130 or object circle 132 and, if the vehicle circle 130 or object circle 132 intersects the object polygon 108 or vehicle boundary 104 respectively, determines the vehicle central angle $\alpha_i$ or object central angle $\beta_i$. The computer 102 determines the smallest central angle θ from the vehicle central angles $\alpha_i$ and object central angles $\beta_i$, determines the time $T_{min}$ to intersection and the path length $s_{min}$, and if the time $T_{min}$ or the path length $s_{min}$ is below the threshold, actuates the component. The process 500 continues for as long as the vehicle 100 remains on.

The process 500 begins in a block 505, in which the computer 102 receives data from the sensors 120.

Next, in a block 510, the computer 102 determines the object polygon 108, as described above.

Next, in a block 515, the computer 102 determines the turning radius $r_v$ and the turning center C, as described above.

Next, in a block 520, the computer 102 selects the next vehicle vertex 126 or object vertex 110. For example, the computer 102 can proceed through the vehicle vertices 126 in the order of the indices, e.g., i=1 through $n_v$, and then the object vertices 110 in the order of the indices, e.g., j=1 through $n_o$.

Next, in a block 525, the computer 102 determines the vehicle circle 130 for the current vehicle vertex 126 or the object circle 132 for the current object vertex 110, as described above.

Next, in a decision block 530, the computer 102 determines whether the vehicle circle 130 determined in the block 525 intersects the object polygon 108, or the computer 102 determines whether the object circle 132 determined in the block 525 intersects the vehicle boundary 104, as both described above. If the computer 102 finds an intersection, the process 500 proceeds to a block 535. If the computer 102 does not find an intersection, the process 500 proceeds to a decision block 540.

In the block 535, the computer 102 determines the vehicle central angle $\alpha_i$ or the object central angle $\beta_i$ for the current vertex 110, 126. The vehicle central angle $\alpha_i$ or object central angle $\beta_i$ becomes a member of the set of angles. After the block 535, the process 500 proceeds to the decision block 540.

In the decision block 540, the computer 102 determines whether any vertices 110, 126 remain. If the computer 102 has performed the blocks 520-535 for all the vehicle vertices 126 and object vertices 110, the process 500 proceeds to a block 545. If the computer 102 has not performed the blocks 520-535 for all the vehicle vertices 126 and object vertices 110, the process 500 returns to the block 520 to continue to the next vertex 110, 126.

In the block 545, the computer 102 determines the smallest central angle θ from the set of angles, i.e., from the vehicle central angles $\alpha_i$ and object central angles $\beta_i$ determined in the block 535, as described above.

Next, in a block 550, the computer 102 determines the time $T_{min}$ and/or the path length $s_{min}$, as described above.

Next, in a decision block 555, the computer 102 determines whether the time $T_{min}$ or the path length $s_{min}$ is below the threshold. If so, the process 500 proceeds to a block 560. If not, the process 500 proceeds to a decision block 565.

In the block 560, the computer 102 actuates the component, e.g., the brake system 116, the steering system 118, and/or the user interface 124, as described above. A process 600 below provides additional description for actuating the steering system 118. After the block 560, the process 500 proceeds to the decision block 565.

Next, in the decision block 565, the computer 102 determines whether the vehicle 100 is still on. If the vehicle 100 is on, the process 500 returns to the block 505 to continue monitoring for objects 106. If the vehicle 100 has been turned off, the process 500 ends.

Figure 6:
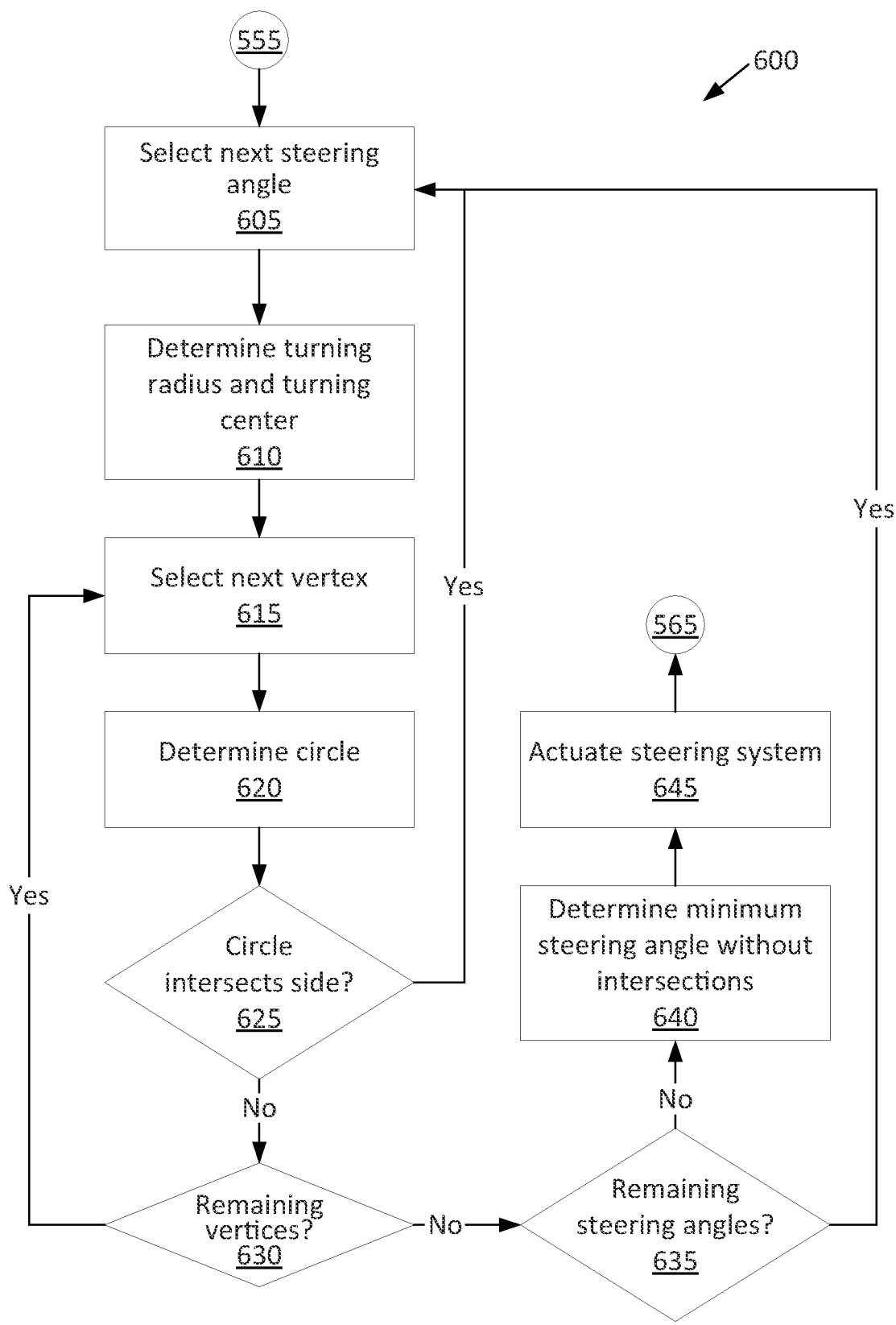
FIG. 6 is a process flow diagram of an example process for turning the vehicle based on the object.

FIG. 6 is a process flow diagram illustrating an exemplary process 600 for actuating the steering system 118 based on the object 106. The memory of the computer 102 stores executable instructions for performing the steps of the process 600 and/or programming can be implemented in structures such as mentioned above. The process 600 can be performed within the block 560 of the process 500 above if actuating the component of the vehicle 100 includes actuating the steering system 118. As a general overview of the process 600, for each candidate steering angle $\delta_i$, the computer 102 determines a candidate turning radius and a candidate turning center and selects a next vertex 110, 126 of the vehicle vertices 126 and object vertices 110. The computer 102 determines the vehicle circle 130 or object circle 132 based on the candidate turning radius and candidate turning center. The computer 102 continues through the vertices 110, 126 until one of the vehicle circles 130 or object circles 132 intersects the object polygon 108 or vehicle boundary 104 or until all vertices 110, 126 are completed. Once all the candidate steering angles $\delta_i$ have been considered, the computer 102 determines the minimum steering angle $\delta_{min}$ for which the object vertices 110 are projected to avoid the vehicle boundary 104 and the vehicle vertices 126 are projected to avoid the object polygon 108, and the computer 102 actuates the steering system 118 to the determined steering angle $\delta_{min}$.

The process 600 begins in a block 605, performed after the decision block 555 of the process 500 above. In the block 605, the computer 102 selects the next candidate steering angle $\delta_i$, e.g., according to the index i starting with 1.

Next, in a block 610, the computer 102 determines the candidate turning radius and the candidate turning center, in the same manner as described above for the turning radius $r_v$ and turning center C but with the candidate steering angle $\delta_i$ instead of the actual steering angle $\delta$.

Next, in a block 615, the computer 102 selects the next vehicle vertex 126 or object vertex 110. For example, the computer 102 can proceed through the vehicle vertices 126 in the order of the indices, e.g., i=1 through $n_v$, and then the object vertices 110 in the order of the indices, e.g., j=1 through $n_o$.

Next, in a block 620, the computer 102 determines a candidate vehicle circle for the current vehicle vertex 126 or a candidate object circle for the current object vertex 110, in the same manner as described above for the vehicle circle 130 and object circle 132, but with the candidate turning radius instead of the actual turning radius $r_v$ and the candidate turning center instead of the actual turning center C.

Next, in a decision block 625, the computer 102 determines whether the candidate vehicle circle determined in the block 620 intersects the object polygon 108, or the computer 102 determines whether the object circle determined in the block 620 intersects the vehicle boundary 104, as both described above for the vehicle circle 130 and object circle 132, but with the candidate turning center instead of the actual turning center C. If the computer 102 finds an intersection, the process 600 returns to the block 605 to try the next candidate steering angle $\delta_i$. If the computer 102 does not find an intersection, the process 600 proceeds to a decision block 630.

In the decision block 630, the computer 102 determines whether any vertices 110, 126 remain for the current candidate steering angle $\delta_i$. If the computer 102 has performed the blocks 615-625 for all the vehicle vertices 126 and object vertices 110 for the current candidate steering angle $\delta_i$, the process 600 proceeds to a decision block 635. If the computer 102 has not performed the blocks 615-625 for all the vehicle vertices 126 and object vertices 110 for the current candidate steering angle $\delta_i$, the process 600 returns to the block 615 to continue to the next vertex 110, 126.

In the decision block 635, the computer 102 determines whether any candidate steering angles $\delta_i$ remain. If the computer 102 has performed the blocks 605-630 for all the candidate steering angles $\delta_i$, the process 600 proceeds to a block 640. If the computer 102 has not performed the blocks 605-630 for all the candidate steering angles $\delta_i$, the process 600 returns to the block 605 to continue to the next candidate steering angle $\delta_i$.

In the block 640, the computer 102 selects a smallest steering angle $\delta_{min}$ from the candidate steering angles $\delta_i$ for which the object vertices 110 are projected to avoid the vehicle boundary 104 and the vehicle vertices 126 are projected to avoid the object polygon 108, as determined in the decision block 625.

Next, in a block 645, the computer 102 actuates the steering system 118 to the determined steering angle $\delta_{min}$. After the block 645, the process 600 proceeds to the block 565 of the process 500 described above.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. Use of "in response to" and "upon determining" indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A computer comprising a processor and a memory, the memory storing instructions executable by the processor to:
    represent a vehicle as a vehicle boundary;
    represent an object as an object polygon including object vertices and object sides;
    determine a turning center of a turning radius of the vehicle;
    select the object vertices projected to intersect the vehicle boundary;
    for the selected object vertices, determine respective object central angles with respect to the turning center between the respective object vertex and an object intersection with the vehicle boundary;
    select a smallest central angle from a set including the object central angles; and
    actuate a component of the vehicle based on the smallest central angle.

2. The computer of claim 1, wherein the vehicle boundary is a vehicle polygon including vehicle vertices and vehicle sides.

3. The computer of claim 2, wherein the instructions further include instructions to:
    select the vehicle vertices projected to intersect the object sides; and
    for the selected vehicle vertices, determine respective vehicle central angles with respect to the turning center between the respective vehicle vertex and a vehicle intersection with the respective object side; and
    wherein the set includes the vehicle central angles.

4. The computer of claim 3, wherein
    the instructions further include instructions to determine respective circles centered on the turning center that pass through the respective vehicle vertices; and
    selecting the vehicle vertices projected to intersect the object sides includes selecting the vehicle vertices for which the respective circles intersect the object sides.

5. The computer of claim 4, wherein
    the circles are vehicle circles;
    the instructions further include instructions to determine respective object circles centered on the turning center that pass through the respective object vertices; and
    selecting the object vertices projected to intersect the vehicle sides includes selecting the object vertices for which the respective object circles intersect the vehicle sides.

6. The computer of claim 2, wherein the vehicle polygon includes at least five vehicle vertices.

7. The computer of claim 1, wherein
    the instructions further include instructions to determine a path length from a current position of the vehicle until the vehicle boundary intersects the object polygon based on the smallest central angle; and
    actuating the component based on the smallest central angle includes actuating the component based on the path length.

8. The computer of claim 7, wherein
    the component includes a brake system; and
    actuating the component based on the smallest central angle includes determining a deceleration for the brake system based on the path length.

9. The computer of claim 7, wherein
    the instructions further include instructions to determine a time to intersection based on the path length and a speed of the vehicle; and
    actuating the component based on the path length includes actuating the component based on the time to intersection.

10. The computer of claim 1, wherein
    the instructions further include instructions to determine at least one of a time or a path length from a current position of the vehicle until the vehicle boundary intersects the object polygon based on the smallest central angle; and actuating the component based on the smallest central angle includes actuating the component based on the at least one of the time or path length.

11. The computer of claim 10, wherein actuating the component based on the smallest central angle includes actuating the component in response to the at least one of the time or the path length being below a threshold.

12. The computer of claim 1, wherein
the instructions further include instructions to determine respective circles centered on the turning center that pass through the respective object vertices; and
selecting the object vertices projected to intersect the vehicle boundary includes selecting the object vertices for which the respective object circles intersect the vehicle boundary.

13. The computer of claim 1, wherein the component includes a brake system.

14. The computer of claim 1, wherein the component includes a steering system.

15. The computer of claim 14, wherein
the instructions further include instructions to determine a steering angle for which the object vertices are projected to avoid the vehicle boundary; and
actuating the component includes actuating the steering system to the determined steering angle.

16. The computer of claim 15, wherein
the instructions further include instructions to, for a plurality of candidate steering angles, determine whether either the object vertices are projected to intersect the vehicle boundary; and
determining the determined steering angle includes selecting a smallest steering angle of the candidate steering angles for which the object vertices are projected to avoid the vehicle boundary.

17. The computer of claim 16, wherein
the instructions further include instructions to determine respective candidate turning centers for the respective candidate steering angles; and
determining whether the object vertices are projected to intersect the vehicle boundary for a respective one of the candidate steering angles is based on the respective candidate turning center.

18. The computer of claim 1, wherein the instructions further include instructions to determine the turning radius based on one of a steering angle or a planned path of the vehicle.

19. The computer of claim 1, wherein
the component includes a user interface; and
actuating the component based on the smallest central angle includes instructing the user interface to output a message.

20. A method comprising:
representing a vehicle as a vehicle boundary;
representing an object as an object polygon including object vertices and object sides;
determining a turning center of a turning radius of the vehicle;
selecting the object vertices projected to intersect the vehicle boundary;
for the selected object vertices, determining respective object central angles with respect to the turning center between the respective object vertex and an object intersection with the vehicle boundary;
selecting a smallest central angle from a set including the object central angles; and
actuating a component of the vehicle based on the smallest central angle.

* * * * *